US009676502B2

(12) United States Patent
Baudassé et al.

(10) Patent No.: US 9,676,502 B2
(45) Date of Patent: Jun. 13, 2017

(54) ASSEMBLY FOR AIMING AN INSTRUMENT

(71) Applicant: THALES, Courbevoie (FR)

(72) Inventors: Yannick Baudassé, Cannes la Bocca (FR); Stéphane Vézain, Mandelieu (FR); Paul Mouille, Cannes la Bocca (FR); Didier Stanek, Cannes la Bocca (FR)

(73) Assignee: THALES, Courbevoie (FR)

( * ) Notice: Subject to any disclaimer, the term of this patent is extended or adjusted under 35 U.S.C. 154(b) by 2 days.

(21) Appl. No.: 14/990,649

(22) Filed: Jan. 7, 2016

(65) Prior Publication Data
US 2016/0200456 A1 Jul. 14, 2016

(30) Foreign Application Priority Data

Jan. 14, 2015 (FR) .................................. 15 00071

(51) Int. Cl.
| *B64G 1/40* | (2006.01) |
| *B64G 1/66* | (2006.01) |
| *F02K 9/84* | (2006.01) |
| *F02K 9/80* | (2006.01) |
| *B64G 1/26* | (2006.01) |

(52) U.S. Cl.
CPC ................. *B64G 1/66* (2013.01); *B64G 1/40* (2013.01); *F02K 9/805* (2013.01); *F02K 9/84* (2013.01); *B64G 1/26* (2013.01); *F05D 2250/43* (2013.01)

(58) Field of Classification Search
CPC .... B64G 1/26; B64G 1/40; B64G 1/66; F02K 9/80; F02K 9/805; F02K 9/84
See application file for complete search history.

(56) References Cited

U.S. PATENT DOCUMENTS

| 3,769,710 | A | * | 11/1973 | Reister | ................. | G01C 21/165 244/175 |
| 5,419,521 | A | * | 5/1995 | Matthews | ............... | F16M 11/10 248/179.1 |
| 6,565,043 | B1 | * | 5/2003 | Wittmann | ............... | B64G 1/242 244/169 |
| 2002/0033796 | A1 | * | 3/2002 | Chatenet | .............. | F16M 11/125 345/156 |
| 2005/0183377 | A1 | * | 8/2005 | Johnson | ................. | B64G 1/222 52/646 |

FOREIGN PATENT DOCUMENTS

WO 2013/098386 A1 7/2013

* cited by examiner

*Primary Examiner* — Richard G Davis
(74) *Attorney, Agent, or Firm* — Baker & Hostetler LLP

(57) ABSTRACT

An aiming assembly comprising an instrument and aiming device, the aiming device comprises: a frame, a mobile part comprising a plate, the instrument being fixed onto the plate, the mobile part and the instrument having a centre of gravity, the mobile part being rotationally mobile relative to the frame on a first axis of rotation, and comprising a support configured to cooperate with the plate to allow the plate to be rotationally mobile relative to the frame about a second axis of rotation at right angles to the first axis of rotation, and rotationally mobile relative to the frame on the first axis, the first and second axes of rotation intersecting at a point of intersection. The point of intersection coincides with the centre of gravity of the mobile part and of the instrument, and the support comprises a flexible part configured to compensate for the differential expansions on the second axis of rotation between the frame and the plate.

11 Claims, 7 Drawing Sheets

ASSEMBLY FOR AIMING AN INSTRUMENT

CROSS-REFERENCE TO RELATED APPLICATION

This application claims priority to foreign French patent application No. FR 1500071, filed on Jan. 14, 2015, the disclosure of which is incorporated by reference in its entirety.

FIELD OF THE INVENTION

The invention relates to an aiming assembly comprising an instrument and a device for aiming the instrument such as an antenna, a mirror, a jet. The invention can be applied to the space field but it is also applicable in other fields such as navigation or the positioning of any instrument relative to another. A space application of the invention is taken as the example.

BACKGROUND

In the space applications, it is necessary to be able to orient certain elements of a satellite or of a spacecraft, such as an antenna or a mast, in a predetermined direction, in order, for example, to direct them toward a fixed star, retain an aim toward a point on the surface of the Earth, or even scan a particular area on the surface of the Earth or of any celestial body. On the same principle, it is necessary to position a satellite when placing it in orbit. A satellite is propelled by one or more jets for electrical propulsion or for chemical propulsion. The terms electrical jet or chemical jet are also used. The orientation of each jet makes it possible to position the satellite in the desired position. It is therefore necessary to orient each jet as a function of the desired position of the satellite. Each jet is oriented using a device called an aiming device.

These days, the new jet aiming devices for electrical propulsion need to be made reliable and to be more competitive in terms of costs and lead times. For this, it is necessary to be able to reduce the number of components of the aiming device, which has a direct effect on the cost reduction, and on the manufacturing and assembly, integration and testing time.

Currently, the jet aiming devices for electrical propulsion are composed of a motorized universal joint offset relative to the mass to be moved, that is to say relative to the jet and to the plate on which the jet is fixed. Such a configuration demands the presence of an additional stacking mechanism to keep the assembly in the stacked configuration. This is because the satellite launch phase is accompanied by vibrations, and it is therefore necessary to keep together the assembly formed by the offset plate and the jet during the launch phase through a stacking mechanism.

The specifications require the propulsion components to be positioned in a certain specific configuration so as to be able, in case of failure of the stacking mechanism, to operate in degraded mode. This requirement dictates variable positions of the components depending on the various types of platforms on which the aiming devices are mounted. A standard stacking mechanism prevents this type of multiple-position mounting.

Similarly, for the adjustment and test phases on the ground prior to the satellite launch, it is necessary to be able to move the jets into extreme positions to check that the components are operating correctly. The torque generated by the offsetting of the jets exceeds the motor drive capability of the gear motors and dictates the use of complex and costly compensation mechanisms.

Finally, the installation of a stacking mechanism results in a cost overhead and a significant increase in the weight on the satellite, which runs counter to the desired solution.

SUMMARY OF THE INVENTION

The invention aims to mitigate all or some of the above-mentioned problems by proposing an assembly for aiming an instrument comprising an instrument aiming device with the formation of the axes of rotation of the device making it possible to cancel, or at least greatly limit, the loads applied to the device during the launch phase. The invention offers the advantage of no longer requiring a stacking mechanism.

To this end, the subject of the invention is an aiming assembly comprising an instrument and an aiming device, the aiming device comprising:

a frame,
a mobile part comprising a plate, the instrument being fixed onto the plate, the mobile part and the instrument having a centre of gravity,
the mobile part being rotationally mobile relative to the frame on a first axis of rotation and comprising a support configured to cooperate with the plate so as to allow the plate to be rotationally mobile relative to the frame about a second axis of rotation at right angles to the first axis of rotation, and rotationally mobile relative to the frame on the first axis, the first and second axes of rotation intersecting at a point of intersection, characterized in that the point of intersection coincides with the centre of gravity of the mobile part and of the instrument, and in that the support comprises a flexible part configured to compensate for the differential expansions on the second axis of rotation between the frame and the plate.

According to one embodiment, the plate is rotationally mobile relative to the frame about a third axis of rotation at right angles to the first and second axes of rotation, the third axis of rotation intersecting with the first and second axes of rotation at the point of intersection.

Advantageously, according to the above embodiment, the support is configured to cooperate with the plate so as to allow the plate to be rotationally mobile relative to the frame about the third axis of rotation.

Advantageously, the plate is rotationally mobile relative to the frame about the third axis of rotation with an amplitude of 360°.

Advantageously, the support comprises a U-shaped arm, the arm having two ends and a central part, a first of the two ends being linked to the central part by a first branch and a second of the two ends being linked to the central part by a second branch, the central part being rotationally mobile relative to the frame on the first axis of rotation. The plate is positioned between the two ends of the arm, and the two ends are configured to allow the rotation of the plate relative to the frame about the second axis of rotation and the second branch forms the flexible part of the support.

Advantageously, the aiming device comprises a first actuator associated with the first axis of rotation and allowing the rotation of the mobile part relative to the frame.

Advantageously, the aiming device comprises a second actuator associated with the second axis of rotation and allowing the rotation of the plate relative to the frame.

According to one embodiment, the instrument is a jet.

According to another embodiment, the aiming device comprises a conductor intended to supply the jet, the conductor linking the mobile part to the frame. The conductor comprises a first part wound about the first axis of rotation between the frame and the mobile part.

According to another embodiment, the conductor comprises a second part wound about the second axis of rotation at the level of the support.

The invention relates also to any space equipment item comprising an aiming assembly as described in this application.

BRIEF DESCRIPTION OF THE DRAWINGS

The invention will be better understood and other advantages will become apparent on reading the detailed description of an embodiment given by way of example, the description being illustrated by the attached drawing in which.

DETAILED DESCRIPTION

In the interests of clarity, the same elements will bear the same references in the different figures.

In the description of the present application, the invention is described in the context of a space application. As cited previously, the invention can be applied to any other technical field requiring the implementation of a device for aiming any instrument.

Figure 1:
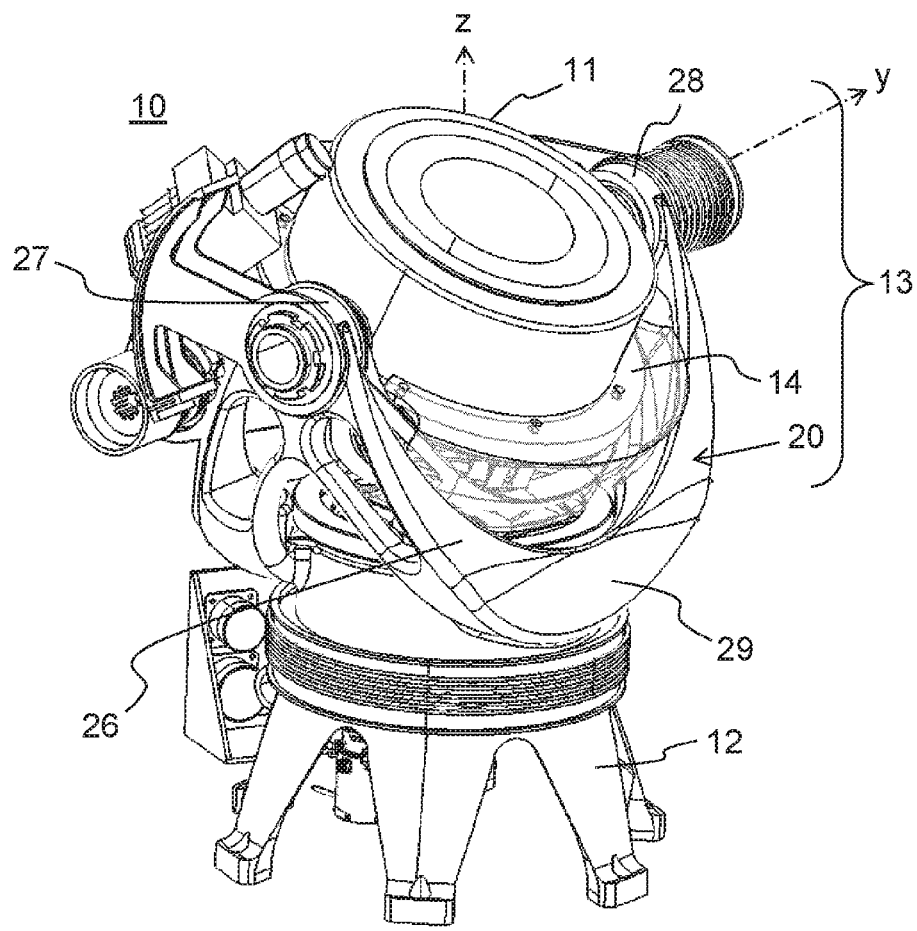
FIG. 1 represents a first embodiment of an aiming device of the aiming assembly according to the invention.

FIG. 1 represents a first embodiment of an aiming device 10 of the aiming assembly according to the invention. The aiming device 10 is intended to make an instrument 11 aim in a predetermined direction. In the context of a space application, the instrument 11 can for example be an antenna that is to be aimed toward a determined point on the surface of the Earth. The instrument 11 can also be a jet, the orientation of which allows for the positioning of a satellite on which it is mounted. It is therefore necessary to orient the jet as a function of the desired position of the satellite.

The aiming device 10 comprises a frame 12. The frame 12, in this satellite example, is fixed onto the satellite. The aiming device 10 comprises a mobile part 13 comprising a plate 14, the instrument 11 being fixed onto the plate 14. The mobile part 13 and the instrument have a centre of gravity G. The mobile part 13 is rotationally mobile relative to the frame 12 on a first axis of rotation Z. The plate 14, for its part, is rotationally mobile relative to the frame 12 about a second axis of rotation Y at right angles to the first axis of rotation Z. In other words, the mobile part 13 comprises two pivot links, a first pivot link being about the axis Z and a second pivot link being about the axis Y. The first and second axes of rotation Z, Y intersect at a point of intersection O. According to the invention, the point of intersection O of the axes of rotation Y, Z coincides with the centre of gravity G of the mobile part 13 and of the instrument. In other words, the mobile part 13 and the instrument 11 form an assembly whose centre of gravity G coincides with the point of intersection O of the two axes of rotation Y, Z.

The mobile part 13 comprises a support 20. The support 20 is configured to cooperate with the plate 14 so as to allow the plate 14 to be rotationally mobile relative to the frame 12 on the first axis of rotation Z and to be rotationally mobile relative to the frame 12 about the second axis of rotation Y.

Figure 2:
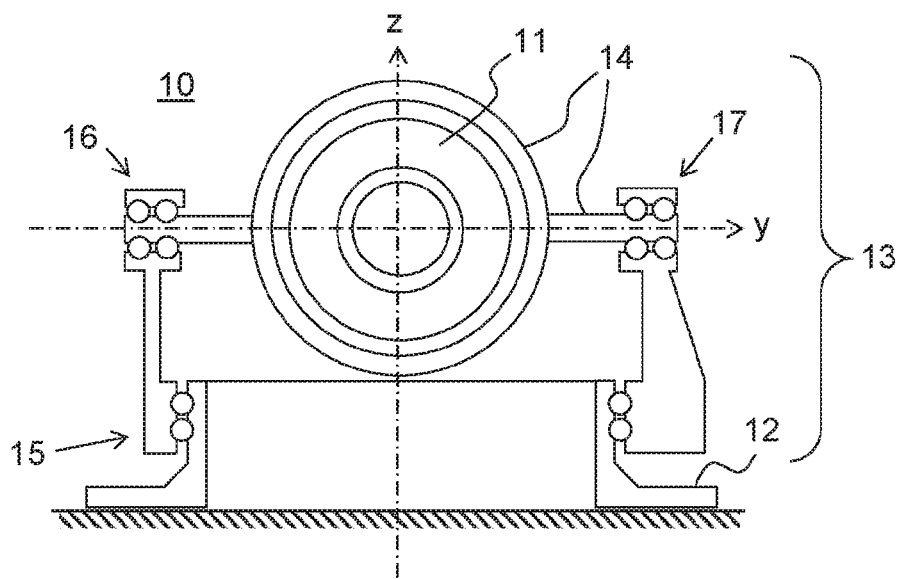
FIG. 2 illustrates two pivot links of the aiming device according to the invention, FIGS. 3a and 3b schematically represent two embodiments of the arrangement of the axes of rotation of the aiming device according to the invention.

FIG. 2 illustrates two pivot links of the aiming device 10 according to the invention. The first pivot link 15 of the mobile part 13 about the axis Z is obtained by a pair of two rolling bearings. This is described as cantilevered construction. The second pivot link allowing the rotation of the plate 14 and therefore of the instrument 11 about the axis Y is obtained by two pairs of rolling bearings 16, 17 mounted as bearings. In other words, in this configuration, the two ends 27, 28 of the arm 26 of the support 20 each receive a pivot link allowing the rotation of the plate 14 about the second axis of rotation Y. It is perfectly possible to provide a bearing mounting on the first axis of rotation Z and/or a cantilevered construction on the second axis of rotation Y. It will however be noted that the cantilevered construction configuration on the first axis of rotation Z and a bearing mounting on the second axis of rotation Y is particularly advantageous, notably in the case where the instrument 11 is a jet, this configuration making it possible to limit the blocking of the field of view toward space, while improving the thermal environment of the jet.

Figure 9:
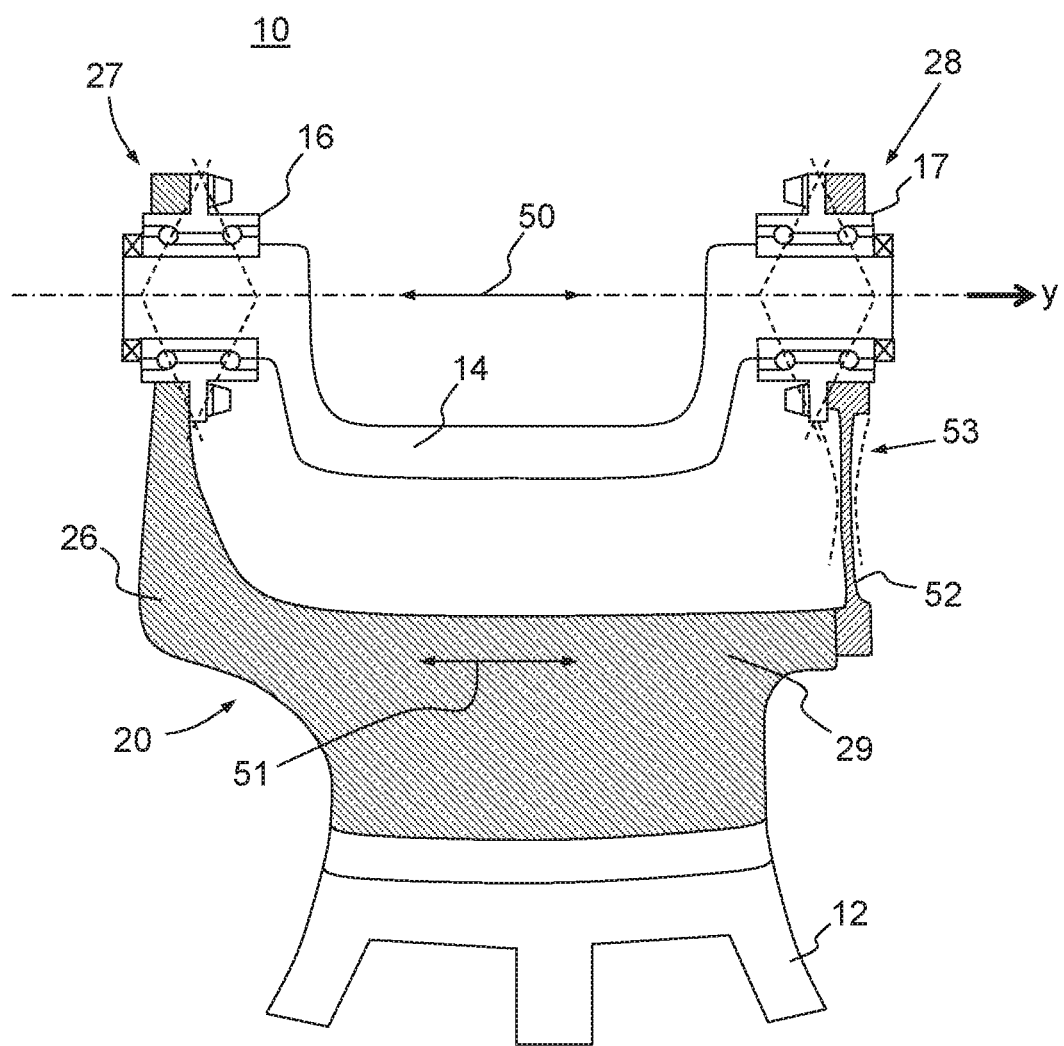
FIG. 9 represents another embodiment of the aiming device according to the invention.

According to an advantageous embodiment, the support 20 can comprise a rigid part and a flexible part, the flexible part being configured to compensate for the differential expansions on the second axis of rotation Y between the frame 12 and the plate 14. As explained previously and as can be seen in FIG. 9, the mounting of the second pivot link is called bearing mounting, the guiding systems 16, 17 being located on either side of the object 11 to be guided. In the case of a bearing mounting, the distance between the two guiding systems 16, 17 is generally significant and therefore, when the parts are subjected to wide temperature swings, differential deformations occur between the parts. The addition of flexibility renders the mounting isostatic. Since the rolling bearings 16, 17 are mounted prestressed on their axis as on their respective hub, the latter allow no movement on their axis. The flexibility is in the direction of the axis of rotation, that is to say the second axis of rotation Y. This makes it possible to protect the guiding components (such as the rolling bearings 16, 17) from the differential movements between the supported part (the plate 14) and the supporting part (the frame 12). The flexible part is intended to compensate the differential expansions between the frame 12 and the plate 14 on the axis of rotation Y, indicated by the arrows 50, 51. The flexible part is able to move 53 on the axis of rotation Y, as indicated in FIG. 9 by the dotted lines, when the device 10 is subjected to thermal variations. The flexible part takes up the load in the plane normal to the axis of rotation Y. The rigid part, for its part, takes up the loads on all the axes.

The flexible part is generally obtained by a flexible blade 52, composed of a rigid base screwed onto a rigid support (the central part 29 of the arm 26 in FIG. 0) and a rigid hub on its opposite part suitable for receiving a rolling bearing 17 for example. There is no departure from the scope of the invention if, instead of a flexible blade, a flexible plate is used, or any other linear element provided with a certain flexibility.

It is also possible, when bulk permits, to produce a membrane composed of two rigid crown rings linked together by a thin disk that can be deformed on the axis of the crown rings. The materials used are usually stainless steel, copper alloys or titanium.

The flexural capacity of the flexible blade is generally of the order of a few tenths of millimetres at the head of the blade at the level of the rolling bearings 16, 17. This flexural capacity can change to a millimetre in the case of parts used that are very long. For example, for a temperature differential of 50 to 70° C. and a distance between the rolling bearings of 200 to 300 mm, the flexible blade has a flexural capacity of approximately 0.3 mm.

The support 20 comprises a U-shaped arm 26, the arm 26 having two ends 27, 28 and a central part 29, the central part 29 being rotationally mobile relative to the frame 12 on the first axis of rotation Z. The plate 14 is positioned between the two ends 27, 28 of the arm 26, and the two ends 27, 28 are configured to allow the rotation of the plate 14 relative to the frame 12 about the second axis of rotation Y. By virtue of its U shape, the arm 26 allows the instrument 11 to aim freely in the desired direction, with no obstacle in its aiming direction, independently of the rotations about the axes Y and Z of the plate 14. The arm 26 has a U shape. U shape should be understood to mean any shape similar to a U, that is to say any shape having a central part 29 extending in one direction and ending with two ends extending in another direction substantially at right angles to the direction of the central part 29. In the extreme case, the arm 26 can also be substantially semi-circular. The arm 26 is configured to allow the rotation of the plate 14 positioned between its two ends 27, 28.

The support 20 adds extra rigidity to the aiming device 10. It also constitutes a support for the pivot links.

The flexible part constitutes a flexibility which can be situated at various points on the stiffness path. The aim of this flexibility is to protect the rolling bearings which are brittle elements in the face of the thrusts caused by the expansion of the different guided elements. Thus, the central part 29 and the first branch can form the rigid part of the support 20 and the second branch can form the flexible part of the support 20.

Figure 3A:
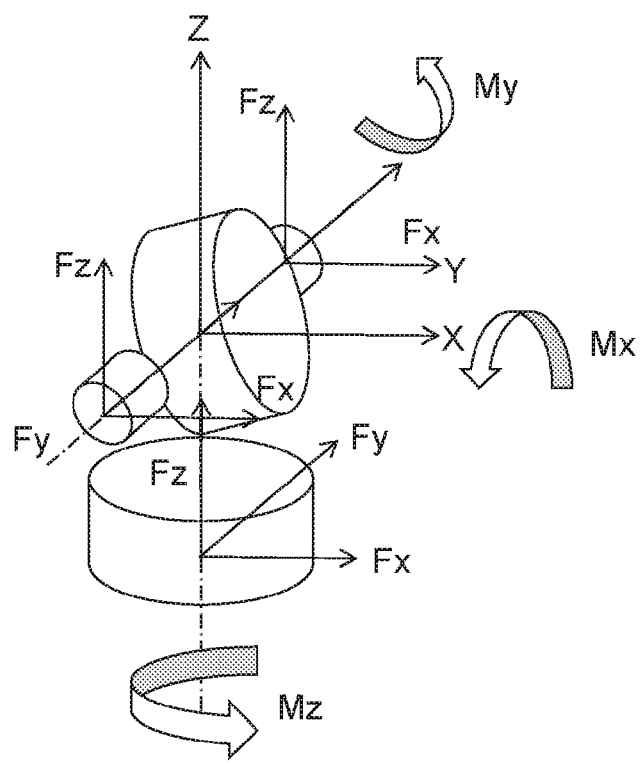

FIG. 3a schematically represents an embodiment of the arrangement of the axes of rotation of the aiming device 10 according to the invention. Only the mobile part 13 of the aiming device 10 is represented. As explained previously, one of the objectives of the invention is to reduce the number of components of the aiming device, and notably to dispense with a stacking device. During the launch phase, the aiming device is subjected to accelerations due to the vibrations of the launch. A stacking device makes it possible to keep the aiming device in its configuration. The arrangement of the axes of rotation of the aiming device 10 as represented in FIG. 3a makes it possible to ensure that the loads are taken up by the existing elements and thus dispense with a specific system. As illustrated in FIG. 3a, each pivot link has applied to it loads that can be divided up into forces denoted F and moments denoted M. Thus, if an orthonormal reference frame (O, X, Y, Z) is considered, O being the point of intersection already defined, Y being the second axis of rotation, Z being the first axis of rotation and X being an axis at right angles to the axes Y and Z, each pivot link has associated with it loads denoted Fx, Fy, Fz, Fx representing the projection of the force F in the orthonormal reference frame (O, X, Y, Z) respectively on the axis X, the axis Y and the axis Z. Moreover, the mobile part 13 is also subjected to moments Mx, My, Mz respectively on the axes X, Y and Z. With its centre of gravity G coinciding with the point of intersection O of its axes of rotation Y and Z, the loads denoted Fx, Fy, Fz and Mx are fully taken up by the pivot links of the mobile part 13.

Figure 3B:
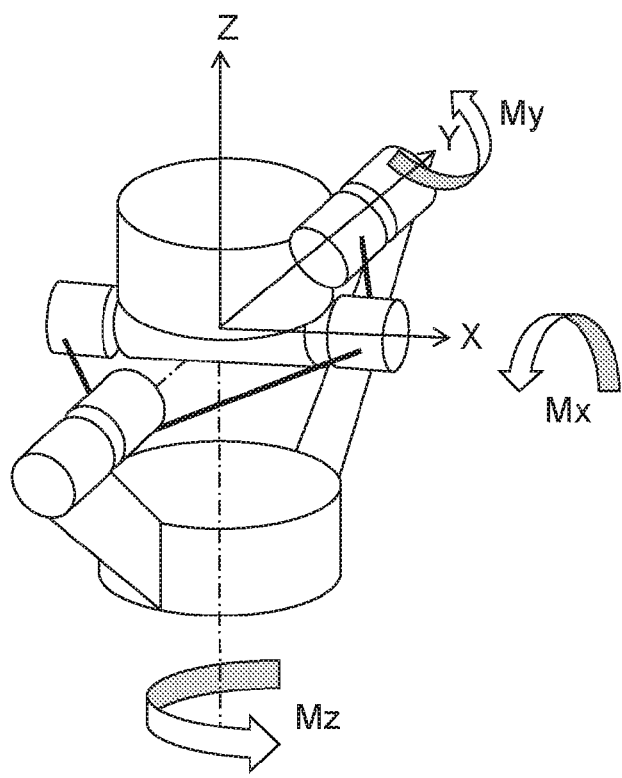

FIG. 3b schematically represents another embodiment of the arrangement of the axes of rotation of the aiming device 10 according to the invention. The embodiment of FIG. 3b is identical to that of FIG. 3a. In the embodiment of FIG. 3b, the plate 14 is, in addition, rotationally mobile relative to the frame 12 about a third axis of rotation X at right angles to the first and second axes of rotation Y, Z, the third axis of rotation X intersecting with the first and second axes of rotation Z, Y at the point of intersection O. As for the embodiment represented in FIG. 3a, the arrangement of the axes of rotation of the aiming device 10 as represented in FIG. 3b makes it possible to ensure, in a similar manner between the axis X and the axis Y, that the loads are taken up by the existing elements, and thus dispense with a specific system.

In the embodiment of FIG. 3b, the support 20 is configured to cooperate with the plate 14 so as to allow the plate 14 to be rotationally mobile relative to the frame 12 about the second axis of rotation Y and the third axis of rotation X and rotationally mobile relative to the frame 12 on the first axis of rotation Z.

The plate 14 can be rotationally mobile relative to the frame 12 about the third axis of rotation X with an amplitude of 360°. This is because the support 20 is configured to cooperate with the plate 14 so as to allow the plate 14 to be rotationally mobile relative to the frame 12 about the second axis of rotation Y and the third axis of rotation X and rotationally mobile relative to the frame 12 on the first axis of rotation Z. Also, the instrument 11 is configured to allow the rotation of the plate 14 and of the instrument 11 about the third axis of rotation X. This rotation can be complete but it can also be 90° or 120° depending on the desired aiming. As represented in FIG. 3b, the plate 14 and the instrument 11 are positioned between the ends 27, 28 of the arm 26. The support 20 can similarly comprise a second arm fixed to the arm 26 such that the second arm has two ends positioned along the axis X, on either side of the plate 14 and of the instrument 11.

Figure 4:
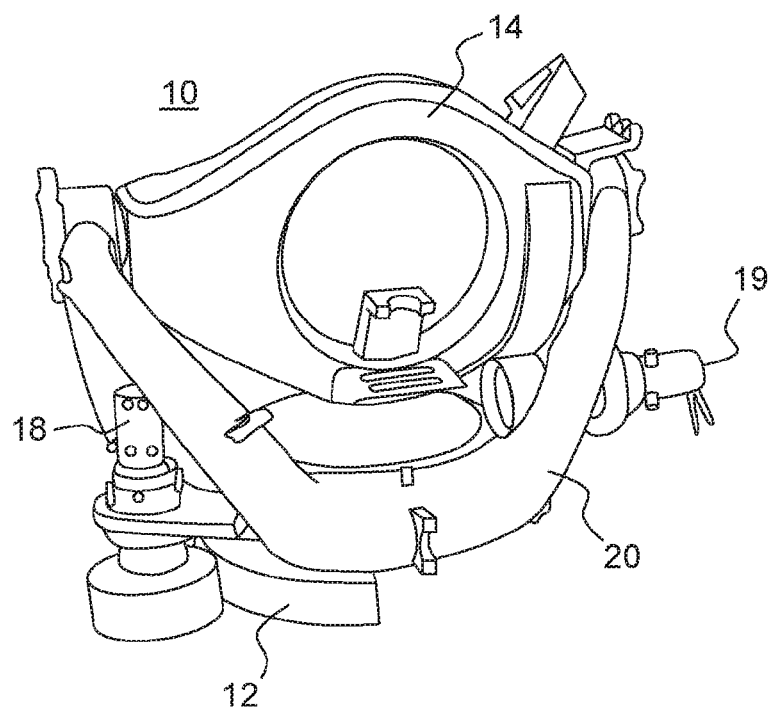
FIG. 4 represents two actuators associated with two axes of rotation of the aiming device according to the invention, FIG. 5 schematically represents the actuators of the aiming device according to the invention.

FIG. 4 represents two actuators associated with two axes of rotation of the aiming device according to the invention. The aiming device 10 comprises a first actuator 18 associated with the first axis of rotation Z and allowing the rotation of the mobile part 13 relative to the frame 12. The actuator 18 comprises a first gear motor and a first angular sensor. The aiming device 10 also comprises a second actuator 19 associated with the second axis of rotation Y and allowing the rotation of the plate relative to the frame. The actuator 19, similarly, comprises a second gear motor and a second angular sensor. The two angular sensors each detect an angular position, that of the mobile part 13 and that of the plate 14, making it possible to determine the real position of the instrument 11. A comparison between the real position and the desired position of the instrument 11 is performed. If the real position differs from the desired position, the actuators 18 and 19 are activated such that the gear motors allow the rotation of the mobile part 13 and of the plate 14 so as to position the instrument 14 in the desired position. The support 20 is the mounting interface for the gear motors.

It is the support 20 which receives the mechanical stops to limit the rotation of the two axes Y and Z.

Figure 5:
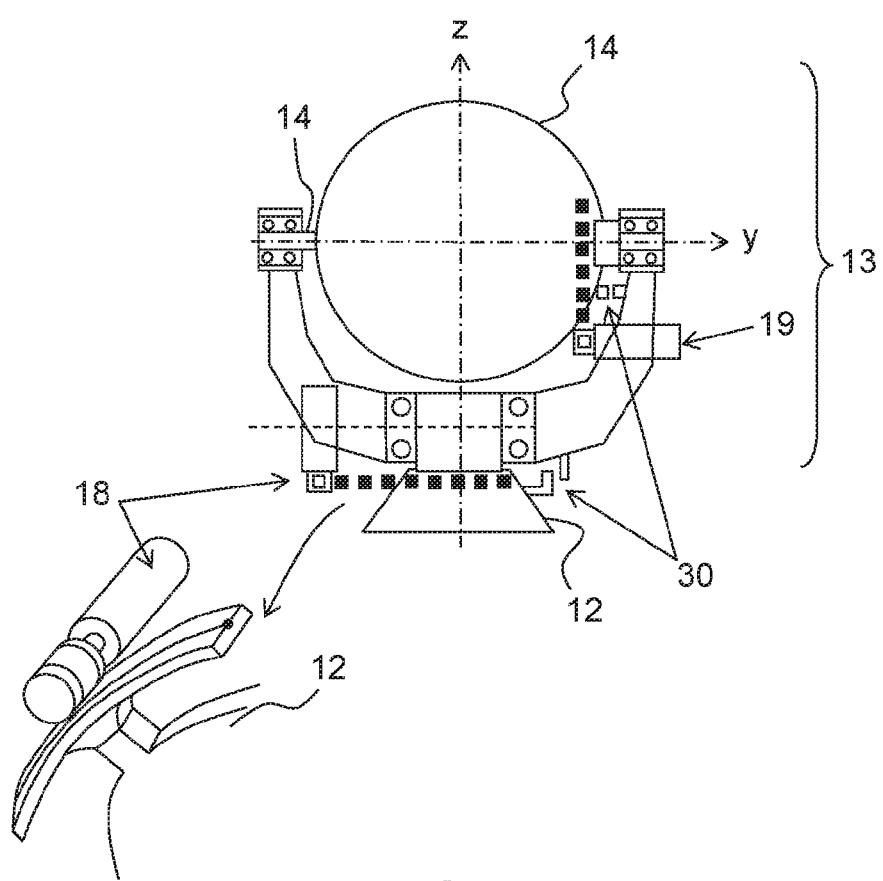

FIG. 5 schematically represents the actuators 18 and 19 of the aiming device 10 according to the invention. Previously, it has been seen that the loads denoted Fx, Fy, Fz and Mx are fully taken up by the pivot links of the mobile part 13. The residual moments My and Mz, both linked to any relocation of the centre of gravity G relative to the axis of rotation, are, for their part, taken up by the actuators 18 and 19.

The actuators 18, 19 can comprise a gear motor with gear pairs (such as a planetary gear), called first reducing gear and a blade reducing gear, called second reducing gear or secondary reducing gear. The blade reducing gear offers the advantage of an offsetting of the gear motor relative to the heat source induced by the jet. It also offers the advantage of being able to reduce the angular plays of the first reducing gear thus ensuring a better accuracy. Finally, the secondary blade reducing gear can increase the motor drive torque and the irreversibility under load.

The aiming device 10 also comprises mechanical abutments 30 making it possible to limit the rotations, respectively on the axes Y and Z.

Figure 6:
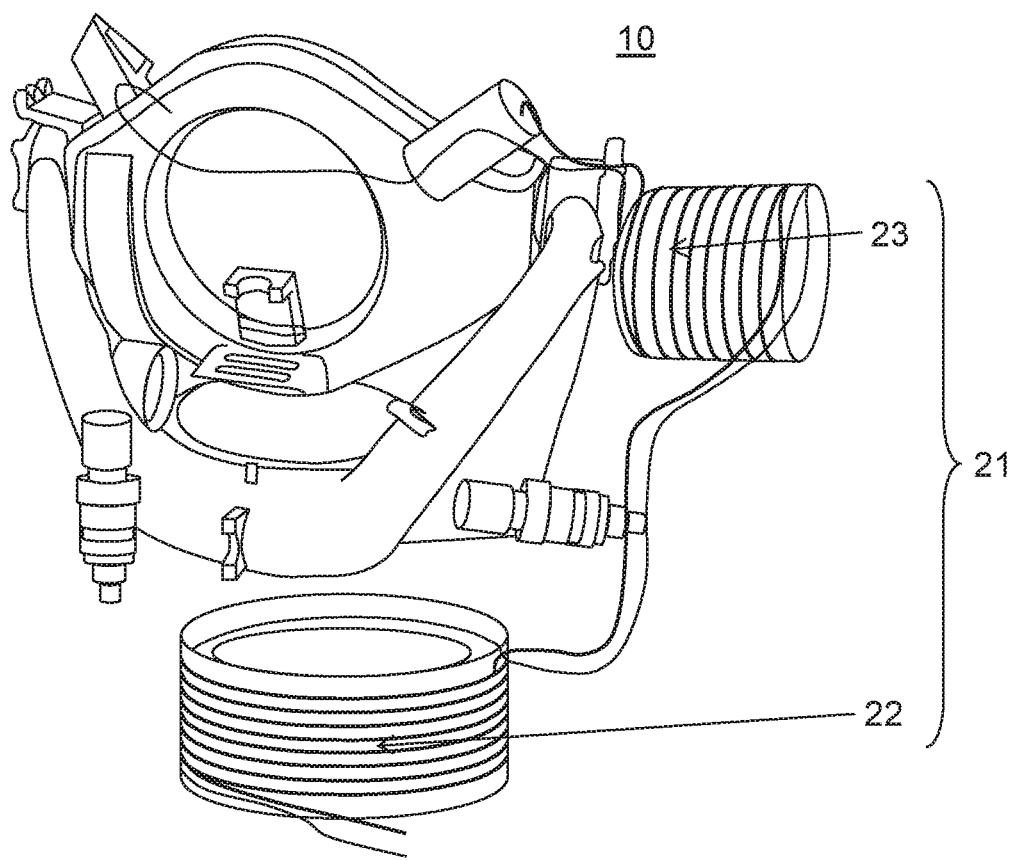
FIG. 6 illustrates an embodiment of power supply wiring of the aiming device according to the invention.

FIG. 6 illustrates an embodiment of power supply wiring of the aiming device 10 according to the invention. In the case where the instrument 11 is a jet, the latter has to be powered, whether electrically or chemically. The aiming device 10 comprises a conductor 21 intended to supply the jet, the conductor 21 linking the mobile part 13 to the frame 12. The conductor 21 comprises a first part wound 22 around the first axis of rotation Z between the frame 12 and the mobile part 13. This is generally referred to as a conductor 21 intended to supply the jet but, more specifically, the aiming device 10 can comprise conductors 21 each intended to chemically, fluidically and/or electrically supply the jet (depending on the type of jet propulsion). The conductor 21 can for example consist of a tube or pipe intended to supply the jet with a fluid in the case of a jet with chemical propulsion. The conductor 21 can also be an electrical conductor in the case of a jet with electrical propulsion. More generally, the conductor 21 is a conductor for a double supply (electrical and fluidic).

The conductor 21 comprises a second part wound 23 around the second axis of rotation Y at the level of the support 20. The part of the conductor 21 situated between the first wound part 22 and the second wound part 23 of the conductor 21 is fixed to the support 20.

It is also possible to provide other configurations for the positioning of the conductor 21 between the frame 12 and the jet. Nevertheless, the configuration described makes it possible to have a conductor in a very reduced volume and without affecting the rotational mobilities of the aiming device 10 of the jet.

Figure 7:
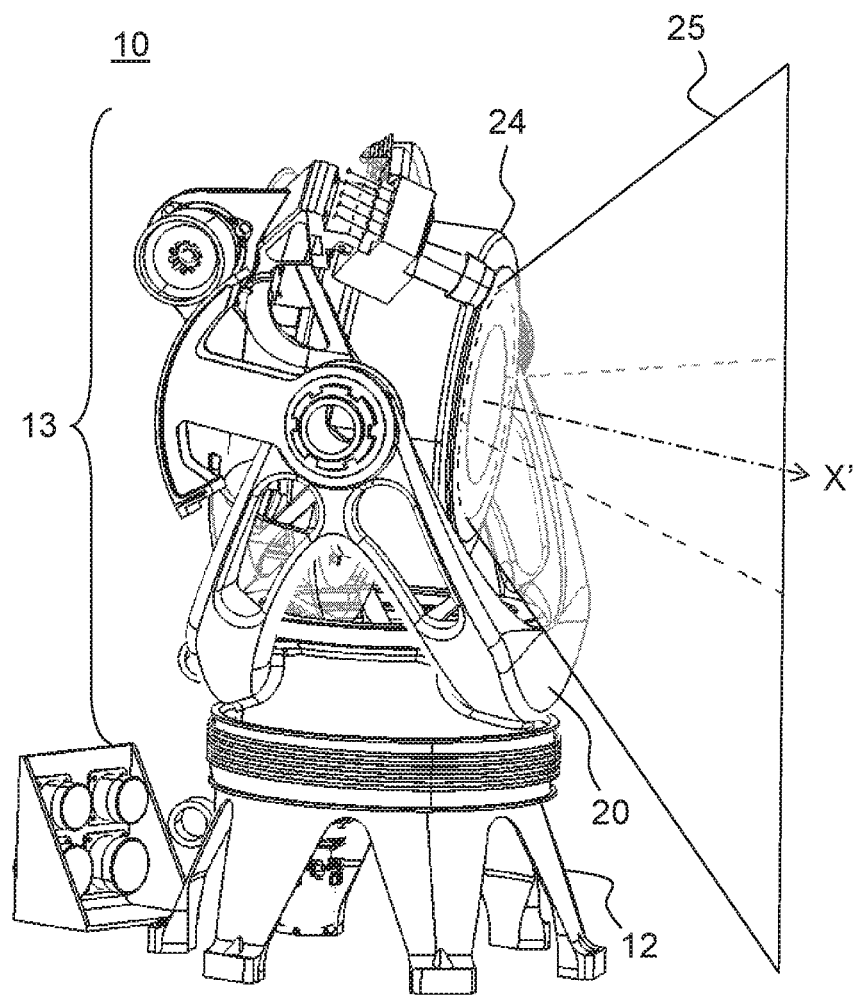
FIG. 7 shows an embodiment of the aiming device of an electrical propulsion jet.
Figure 8:
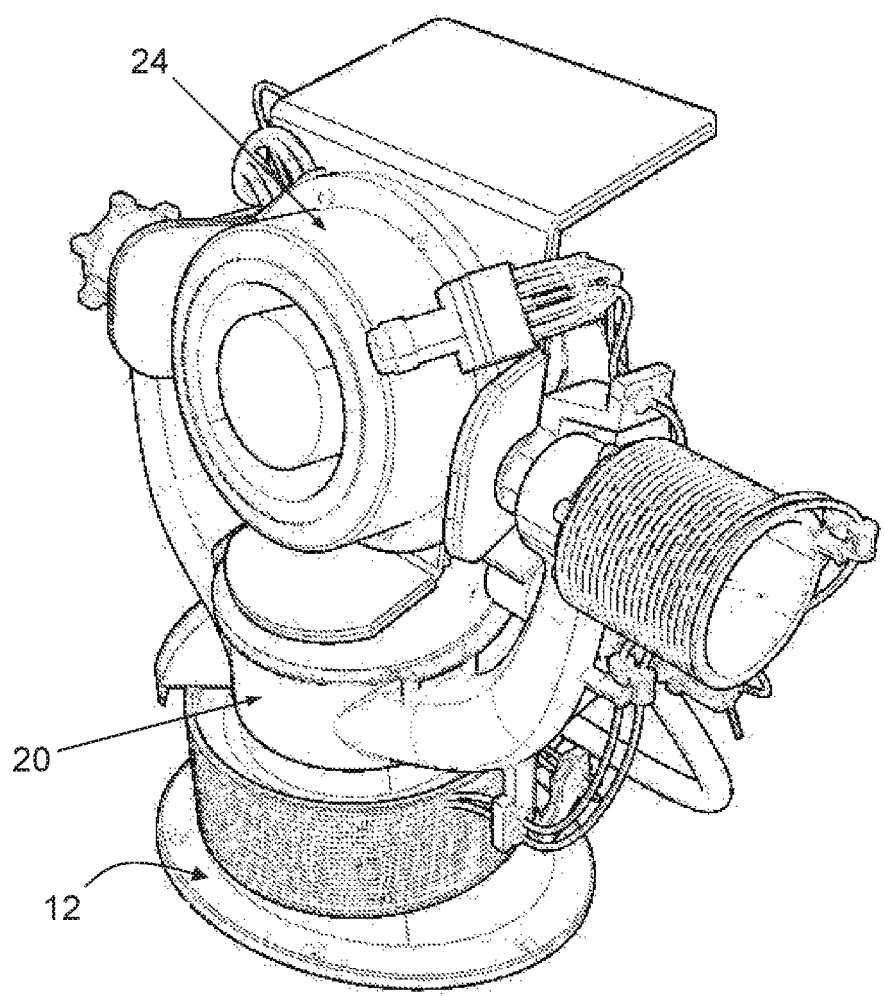
FIG. 8 represents another embodiment of the aiming device according to the invention.

FIG. 7 shows an embodiment of the aiming device 10 of a jet with electrical propulsion 24. The jet with electrical propulsion 24 aims in a direction that is denoted X'. It is known that most of the plasma is ejected in a cone 25 of approximately 45 degrees about the axis X'. Furthermore, advantageously, the aiming device 10 must not have components in the plane of the jet 24. This is because, in operation, the jet 24 generates radiative energy. It is therefore essential to limit the field of view of the jet with the components of the aiming device 10, and maximize, as far as possible, its exposure to the space environment. As explained previously in the description of FIG. 2, an optimal configuration in terms of compactness of the aiming device 10, of volume availability and of view factor of the jet has been obtained with a cantilevered construction on the first axis of rotation Z and a bearing mounting of the rolling bearings mounted on either side of the mobile part 13. Furthermore, the support 20 is configured to allow the jet to be fully oriented towards the space environment. Finally, it is possible to incline the frame 12 as represented in FIG. 8. In this other embodiment of the aiming device 10, the inclination of the frame 20 allows the jet 24 to be oriented toward space with no component of the aiming device 10 being located in the plasma cone 25.

Since the aiming device 10 is a compact device that can comprise a jet generating radiative and conductive thermal fluxes, the components of the aiming device 10 are exposed to these fluxes. To improve the life of these components, it is possible to protect them thermally by covering them with a thermal insulation layer.

The invention relates also to any space equipment item comprising an aiming device 10 as described previously.

The invention claimed is:

1. An aiming assembly comprising an instrument and an aiming device, the aiming device comprising:
   a frame,
   a mobile part comprising a plate, the instrument being fixed onto the plate, the mobile part and the instrument having a centre of gravity,
   the mobile part being rotationally mobile relative to the frame on a first axis of rotation and comprising a support configured to cooperate with the plate so as to allow the plate to be rotationally mobile relative to the frame about a second axis of rotation at right angles to the first axis of rotation, and rotationally mobile relative to the frame on the first axis, the first and second axes of rotation intersecting at a point of intersection,
   wherein the point of intersection coincides with the centre of gravity of the mobile part and of the instrument, and wherein the support comprises a flexible part configured to compensate for the differential expansions on the second axis of rotation between the frame and the plate.

2. The aiming assembly according to claim 1, wherein the plate is rotationally mobile relative to the frame about a third axis of rotation at right angles to the first and second axes of rotation, the third axis of rotation intersecting with the first and second axes of rotation at the point of intersection.

3. The aiming assembly according to claim 2, wherein the support is configured to cooperate with the plate so as to allow the plate to be rotationally mobile relative to the frame about the third axis of rotation.

4. The aiming assembly according to claim 2, wherein the plate is rotationally mobile relative to the frame about the third axis of rotation with an amplitude of 360°.

5. The aiming assembly according to claim 1, wherein the support comprises a U-shaped arm, the arm having two ends and a central part, a first of the two ends being linked to the central part by a first branch and a second of the two ends being linked to the central part by a second branch, the central part being rotationally mobile relative to the frame on the first axis of rotation, wherein the plate is positioned between the two ends of the arm, wherein the two ends are configured to allow the rotation of the plate relative to the frame about the second axis of rotation, and wherein the second branch forms the flexible part of the support.

6. The aiming assembly according to claim 1, wherein the aiming device comprises a first actuator associated with the first axis of rotation and allowing the rotation of the mobile part relative to the frame.

7. The aiming assembly according to claim 1, wherein the aiming device comprises a second actuator associated with the second axis of rotation and allowing the rotation of the plate relative to the frame.

8. The aiming assembly according to claim 1, wherein the instrument is a jet.

9. The aiming assembly according to claim 8, wherein the aiming device comprises a conductor to supply the jet, the conductor linking the mobile part to the frame, wherein the conductor comprises a first part wound about the first axis of rotation between the frame and the mobile part.

10. The aiming assembly according to claim 8, wherein the aiming device comprises a conductor to supply the jet, the conductor linking the mobile part to the frame, wherein the conductor comprises a second part wound about the second axis of rotation at the level of the support.

11. A spacecraft comprising an aiming assembly according to claim 1.

* * * * *